United States Patent [19]

Wolinski

[11] 3,994,764

[45] Nov. 30, 1976

[54] ADHESIVE COMPOSITIONS

[75] Inventor: Leon E. Wolinski, Cheektowaga, N.Y.

[73] Assignee: Pratt & Lambert, Inc., Buffalo, N.Y.

[22] Filed: June 13, 1975

[21] Appl. No.: 586,655

[52] U.S. Cl. .............................. 156/218; 156/310; 156/331; 156/314; 156/332; 156/330; 260/830 P; 260/901; 260/859 R; 428/416; 428/425; 428/424

[51] Int. Cl.² .................... B29D 23/10; B32B 7/00

[58] Field of Search ........... 156/310, 314, 330, 331, 156/332, 334, 218; 428/416, 420, 424, 425; 260/830 P, 858, 859 R, 901

[56] References Cited
UNITED STATES PATENTS

| | | | |
|---|---|---|---|
| 2,859,200 | 11/1958 | Lappala | 156/332 |
| 2,876,725 | 3/1959 | Buck et al. | 156/332 |
| 2,916,469 | 12/1959 | Lal | 156/332 |
| 2,921,045 | 1/1960 | Di Martino | 156/332 |
| 2,981,650 | 4/1961 | Bader et al. | 156/332 |
| 3,148,167 | 9/1964 | Keplinger | 260/830 P |
| 3,290,208 | 12/1966 | Lewis et al. | 156/331 |
| 3,315,380 | 4/1967 | Mack et al. | 156/310 |
| 3,362,036 | 1/1968 | Swan et al. | 156/331 |
| 3,384,679 | 5/1968 | Stetz | 260/830 P |
| 3,426,099 | 2/1969 | Freifeld et al. | 260/859 R |
| 3,591,438 | 7/1971 | Toback et al. | 156/310 |
| 3,629,187 | 12/1971 | Waller | 260/42.44 |
| 3,862,021 | 1/1975 | Hagihara et al. | 260/859 R |

Primary Examiner—William A. Powell
Assistant Examiner—J. J. Gallagher
Attorney, Agent, or Firm—Christel & Bean

[57] ABSTRACT

Improved, fast curing adhesives, with and without fillers, and articles bonded therewith are provided. The adhesive comprises a first part made up of a thermoplastic, non-reactive polyurethane polymer dissolved in an addition polymerizable combination of an acrylic or methacrylic monomer, a copolymerizable monomer containing at least one free carboxylic acid group, and a non-activated free radical addition polymerization catalyst system, and a second part comprising an activator for the free radical catalyst system. Exemplary of such a formulation is a first part made up of a polyester urethane, e.g., the condensation polymer of polyethylene adipate and toluene di-isocyanate containing no free isocyanate, dissolved in a mixture of acrylic acid and methyl methacrylate, each of the three components being present in equal amounts. About two weight percent benzoyl peroxide and about 0.1 weight percent hydroquinone are dissolved in the mix. The resulting formulation has a high degree of relative stability in the absence of an activator for the benzoyl peroxide. An appropriate second part, i.e., activator, comprises a tertiary amine, such as N,N-dimethyl aniline, diethyl aniline, N,N-dimethyl-p-toluidine. The second part may also contain an oxidizable heavy metal salt or other known accelerator for such free radical catalyst systems.

63 Claims, No Drawings

ADHESIVE COMPOSITIONS

The present invention relates to adhesives. More particularly it relates to novel adhesive compositions which are curable to form a strong adhesive bond. Still more particularly it relates to fast cure adhesives which form bonds to a wide variety of substrata and which attain exceptional bond shear strengths and peel strengths. It also relates to an adhesive bonding technique appropriate to such adhesives and to articles and materials bonded thereby.

There is considerable interest in the general field of adhesives in formulations which form rapid bonds. Fast bonding adhesives have received much attention, particularly for rapid mass production of a wide range of products. Until recently adhesive bonding has been relatively slow and has been a substantial impediment to production rates where such operations have been employed.

There is in the adhesive art an interest in adhesive formulations effective to bond the widest possible range of substrata, as well. It is most inconvenient to employ different adhesives for each different substrate of interest, and considerable effort has been devoted to the development of "broad spectrum" adhesives which form high strength bonds to a broad diversity of materials.

An ancillary problem has been the requirement of most common adhesives for meticulous surface preparation of the substrate to be bonded. Extensive cleaning, degreasing, roughening, and priming operations are quite time consuming and expensive and any development which moderates or reduces such requirements offers a substantial benefit.

Many adhesive bonding operations impose a requirement for both high peel strength and high shear strength. The combination of both characteristics in a single bond has not heretofore been readily attainable.

Heretofore, many of the best adhesives for overall performance have been solution or emulsion systems, requiring the slow evaporation of water or the hazardous evaporation of flammable and/or toxic solvents. Such bonding systems also result in less than acceptable results when liquid-tight and or vapor-tight bonds are required. The evaporation of a solvent or the like may leave the adhesive permeable to liquids or vapors. Evaporative systems are also difficult to use, requiring great experience and judgement in determining when the adhesive is ready for bonding. If parts are joined too soon, the water or solvent yet to be evaporated may cause a weak bond as it migrates to the joint edge, while too much drying may result in a loss of adhesion. In either case poor bond strength results.

Hot melt adhesives offer excellent performance in some operations, but involve considerable equipment and labor problems and lack adhesion to a number of materials.

In the foregoing context, there has been growing interest in curing-type adhesive systems, but there have been considerable difficulties in this area as well.

In order to develop adequate storage stability, complex two part systems have often been required, which in turn have imposed difficulties in mixing the segregated components adequately, followed by a limited "pot life." If the cure time is sufficiently long to facilitate adequate, thorough blending, rapid bonding cannot be attained. If the cure time is short enough to be useful for mass production operations, adequate mixing and application operations are difficult. Elaborate equipment and complex operations have been developed which add greatly to the expense.

Curable adhesive systems are known where a dormant or inactive curing catalyst is employed which may be activated by heat or radiation after parts to be bonded are coated with the formulation and joined. While such adhesives offer great advantages in numerous contexts, the need to hold the parts in place during activation and cure can add considerably to the expense, while the investment in heating or radiation equipment is also expensive. Such techniques are not as rapid as the art requires and are not applicable at all to some substrata and some forms of adhesive joints. Radiation also introduces a hazard to personnel.

A relatively recent development in the art is the technique of formulating curable adhesive systems with a dormant or inactive curing catalyst which can be activated by contact with a catalyst activator compound. It is now possible to formulate such adhesives which cure rapidly. Such systems have suffered, however, from an inability to attain high shear strength and high peel strength in the same formulation. Most such systems also require sacrificing bond strength and/or cure speed in order to attain acceptable levels of adhesion to a broad variety of substrata. Such formulations have also proved more sensitive than desirable to surface preparation of the substrate, and have generally resulted in bonds exceptionally susceptible to heat. Heat susceptibility is a severe detriment in the manufacture of articles which are to be, for example, painted, where the paint is subjected to none or more bake cycles.

It is readily apparent that it would be highly desirable to obtain an adhesive which, in a single formulation, bonded a wide diversity of materials, with high strength joints, both with respect to shear strength and peel strength, which requires no solvent or other volatile ingredient, which attains bond strength very rapidly but has a long shelf life and pot-life before the joint surfaces are mated, which is effective with minimal or no surface preparation, and which requires no elaborate or expensive equipment for use. To attain all these features and to attain a bond not overly sensitive to heat as well is more desirable still. These and yet other objects are attained by the present invention wherein a non-reactive thermoplastic polyurethane is dissolved in an acrylic monomer and a copolymerizable carboxylic acid group containing monomer, and the solution thus formed is combined with an unactivated dormant free radical polymerization catalyst to form an adhesive, and an activator for the dormant catalyst is separately provided.

In use, the activator is applied to at least one of the surfaces to be joined, the adhesive is applied to at least one of the surfaces to be joined and the surfaces are mated and held in contact until the adhesive bond is formed. By such a technique, all the foregoing objects may be attained. Heat susceptibility of the adhesive bond is enhanced by the inclusion in the adhesive of a non-reactive epoxy resin.

THE POLYURETHANE

Any polyester-based or polyether-based polyurethane resin may be used in the adhesives of the present invention, so long as the resin is non-reactive and thermoplastic — as those terms are hereinafter defined. As employed in the present disclosure, the term "non-reactive," as applied to the polyurethane component of the adhesives, means that the polymer contains no free, unreacted isocyanate groups, with the consequence that the polyurethane does not react to any notable degree with any component of the adhesive composition. A polyurethane which does not meet these criteria can be used in the present invention, but only if it is treated or reacted to bring it into conformity with these requirements. For example, a polyurethane which contains free isocyanate groups can be reacted with a monofunctional alcohol or the like to eliminate free isocyanate. The reactant should, of course, not introduce olefinic unsaturation. The term "thermoplastic" as employed herein applies to polyurethanes which are not gelled or cross-linked and which do not become cross-linked in the present adhesive formulations. Generally, such polyurethanes will be linear, or substantially so, although branching is not prohibited so long as the resultant polymer does not form an acrylic monomer insoluble gel. Extreme branching which results in an insoluble, substantially three dimensional matrix polymer prevents the attainment of the objects of the present invention, and polyurethanes of such character are not contemplated within the scope of the present invention.

The formation of the poly(ester-urethanes) and poly(ether-urethanes) of the present invention are based on the reaction of an isocyanate group with active hydrogen atom containing hydroxyl groups. In order to form a high molecular weight polymer resin, the reactants will generally be difunctional, although minor proportions may have higher levels of functionality, creating some degree of branching, or minor proportions of monofunctional reactants will serve to terminate polymer chains, giving some degree of regulation and control of molecular weight. The formation of such polymers is per se well known to the art and does not as such form any part of the present invention. Indeed many polyurethane resins which meet, or can be readily made to meet, the requirements of the present invention are available commercially, and such readily available and relatively inexpensive materials will often be desirable in the practice of the invention.

In the formation of poly(ether-urethanes), reactive organic polyfunctional polyols reacted with suitable isocyanates are the polyalkylene ether, thioether, and ether-thioether glycols represented by the general formula:

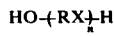

wherein R represents one or more alkylene radicals of up to about 10 carbon atoms, X represents oxygen or sulfur or a mixture of both, and $n$ is an integer. It is greatly preferred that $n$ be an integer large enough so that the molecular weight of the polyalkylene ether, thioether, or ether-thioether glycol is at least about 500, e.g., desirably from about 500 to about 10,000. The polyalkylene ether glycols included within this general formula, such as polyethylene glycols, polypropylene glycols, polybutylene glycols, polytetramethylene glycols, polyhexamethylene glycols, and the like are preferred. Such are obtained, for example, by acid-catalyzed polycondensation of the corresponding monomeric glycols, or by condensation of lower alkylene oxides, such as ethylene oxide, propylene oxide, and the like, either with themselves or with glycols such as ethylene glycol, propylene glycol, and the like.

Polyalkylenearylene ether thioether and ether-thioether glycols which have molecular weights ranging from about 500 to about 10,000, which correspond to the above general formula, differing from the above described polyalkylene glycols, in having arylene radicals, such as phenylene, naphthylene, and anthrylene radicals, either substituted or unsubstituted, in place of some — but not all — the alkylene radicals can be employed. Thus, in the above formula, R will represent a mixture of alkylene and arylene radicals. In such circumstances, it has been found desirable that such materials have a molecular weight of at least about 500 for each such arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art, and forms no part of the present invention per se, it may be mentioned here by way of illustration the polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g., chloroderivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups, such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane resins, i.e., those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula:

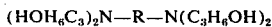

wherein R represents an alkylene radical having from 2 to 6 carbon atoms, inclusive, of which N,N,N',N' - tetrakis-(2-hydroxypropyl)-ethylenediamine is a representative species, as well as higher analogs thereof, such as hydroxypropylated polyalkylenepolyamines of the general formula:

wherein R is as defined hereinabove.

As can be readily appreciated, mixtures of the various reactive organic polyfunctional polyols described hereinabove may also be employed in preparing polyurethane resins useful in the practice of the present invention. Those of ordinary skill in the art will also readily recognize that care needs be taken in the utilization of polyols containing more than two hydroxyl functionalities to be certain that insoluble gel polymers do not result as a consequence of excessive branching and cross-linking during polymerization. Similar considerations will apply to the selection of organic polyisocyanates hereinafter described.

Just as in the case of the polyol reactant, polyurethane resins may be prepared using a wide variety of organic polyisocyanates, among which there are included aromatic diisocyanates, such as m-phenylenediisocyanate, p-phenylenediisocyanate, 4 - t-butyl-m-phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate,
p-xylylenediisocyanate,
cumene-2,4-diisocyanate,
durenediisocyanate,
1,4-naphthylenediisocyanate,
1,5-naphthylenediisocyanate,
1,8-naphthylenediisocyanate,
2,6-naphthylenediisocyanate,
1,5-tetrahydronaphythylenediisocyanate,
p,p'-diphenyldiisocyanate,
diphenylmethane-4,4'-diisocyanate,
2,4-diphenylhexane-1,6-diisocyanate,
"bitolyenediisocyanate" (3,3'-dimethyl-4,4'-biphenylene-diisocyanate),
"dianisidinediisocyanate" (3,3'-dimethoxy-4,4'-biphenyl-enediisocyanate), and
polymethylenepolyisocyanates represented by the general formula:

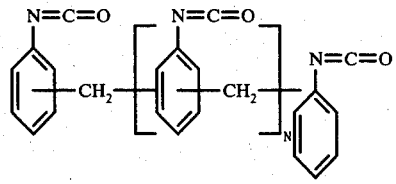

wherein n represents an integer between 0 and about 5, and the like; aliphatic diisocyanates, such as methylenediisocyanate, ethylenediisocyanate, the tri-, tetra-, penta-, hexa-, hepta-, octa-, nona- and decamethylene-, diisocyanates, 2-chlorotrimethylenediisocyanate, 2,3-dimethyltetramethylenediisocyanate, and the like, and tri- and higher isocanates, such as benzene-1,3,5-triisocyanate, toluene - 2,4,6-triisocyanate, diphenyl-2,4,4'-triisocyanate, triphenylmethane-4,4',4" -triisocyanate, and the like. Mixtures of two or more of such organic polyisocyanates may also be employed to prepare the polyurethane resins by reaction with the ethers and esters described above utilizing procedures well known to those skilled in the art.

Examples of these known polyurethane production procedures include the so-called "pre-polymer" technique, as commonly practiced in the production of polyurethane resins, which involves mixing polyol and polyisocyanate under substantially anhydrous conditions, i.e., with usually not more than about 0.2% by weight of water, based on the total weight of the mixture, being present, and with a molar excess of the polyisocyanate over the polyol sometimes being employed, reacting this mixture at a temperature ranging from about room temperature to about 100° C. for from about 20 minutes to about 8 hours, and then cooling the resulting "pre-polymer" to a temperature of from about room temperature to about 60° C.

Such techniques will ordinarily result in polymer molecules containing free isocyanate groups, which are eliminated conveniently by reaction with a monofunctional organic alcohol, phenol, thiol, amine, or other like monofunctional reactant, after completion of the polymerization reaction.

THE ACRYLIC MONOMER

Free radical addition polymerizable acrylic monomers are well known to those of ordinary skill in the art, and for purposes of the present invention conform to the general formula:

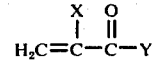

where X may be hydrogen, methyl, ethyl, or a halogen such as chlorine. Among these it is preferred that X be hydrogen or methyl. Y in the above formula may in turn be represented by the general formulae:

—O—R,

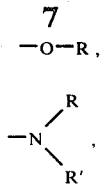

where R and R' each represent hydrogen, alkyl groups of up to 8, and occasionally more, carbon atoms and such alkyl groups substituted with hydroxyl, amino, halo, or aryl substituents.

Those of ordinary skill in the art will readily recognize that the foregoing formulae define acrylic and methacrylic esters, acrylic and methacrylic amides, and variously substituted variations thereof as preferred acrylic monomers. Acrylic acid and methacrylic acid, and other carboxylic acid functional monomers comprise a special case hereinafter discussed in detail and are not intended for inclusion in the group of acrylic monomers here defined. The esters will include, as preferred members of the group, methyacrylate, methylmethacrylate, ethylacrylate, ethylmethacrylate, propylacrylate, propylmethacrylate, n-butylacrylate, n-butylmethacrylate, iso-butylacrylate, iso-butylmethacrylate, and the like. In some circumstances, higher molecular weight esters, such as 2-ethylhexylacrylate and the like, and substituted, particularly hydroxy — or amino-substituted alkyl acrylates and methacrylates, exemplified by, for example, 2-hydroxyethylacrylate and N-methylaminoethyl methacrylate, are useful and desirable. The amides include acrylamide and methacrylamide, and the corresponding N substituted amides.

Still other acrylic monomers may be employed, including acrylonitrile, methacrylonitrile, and diacrylic or dimethacrylic esters and amides, or ester-amides, resulting from the reaction of the acids with a diol, diamine, or the like, such as ethylene glycol dimethacrylate, ethylenediamine dimethacrylamide, acid salts of quarternized ammonium alkyl acrylates and methacrylates, and the like.

Mixtures of two or more of such acrylic monomers is also contemplated in the practice of the present invention.

THE ACID MONOMER

Free radical addition polymerizable carboxylic acid group containing monomers copolymerizable with the aforesaid acrylic monomers constitute the second monomer component of the adhesive.

As will be readily recognized by those of ordinary skill in the art, acrylic acid and methacrylic acid, as well as esters and amides thereof substituted with carboxylic acid groups, meet the foregoing requirements.

Acrylic acid and methacrylic acid are the preferred acid monomers in the practice of the present invention. Other acid monomers of interest which will find use in the practice of the present invention include, for example, the half esters of 2-hydroxyethyl acrylate, or other reactive acrylic species, with dicarboxylic acids, such as maleic, itaconic, fumaric, oxalic, phthalic, and terephthalic acids, mixtures thereof, and the like.

THE CATALYST

Among the cure catalysts that are effective in the adhesives of the present invention are the free radical addition polymerization catalysts which are not active at room temperatures in the absence of an activator component. Such activator components are not included in the adhesive formulation, but rather are dealt with as hereinafter discussed. The catalysts of interest can be defined more precisely as those which have a half life at 85° C. of at least one half hour. A preferred such catalyst is benzoyl peroxide, but those of ordinary skill in the art will recognize that other free radical catalysts may also employed.

THE ADHESIVE FORMULATION

The foregoing components are formulated into an adhesive by dissolving the polyurethane and the catalyst into a mixture of the acrylic monomer component and the acid monomer component. In the solution thus formed, the polyurethane resin component will comprise about 10 to 70, preferably about 20 to 50 weight percent; the catalyst will comprise about 0.1 to 5.0, preferably about 0.5 to 2.0 weight percent, and the balance will be the acrylic monomer- acid monomer blend. These two monomer components should be proportioned in such fashion that the acid monomer comprises at least about 5.0 weight percent of the total formulation, preferably at least about 10.0 weight percent. Since the acid monomer will generally be relatively expensive, it is ordinarily not preferred to use more than about 20.0 weight percent, but there is no reason greater amounts cannot be employed, up to as much as about 67 percent of the adhesive, or even more if desired.

The basic adhesive composition thus formulated is storage stable for considerable periods of time, but where prolonged shelf life is desired, it is preferred to add to the basic formulation a minor amount, usually on the order of about 0.1 to 1.0 of a polymerization inhibitor such as hydroquinone, a hindered phenol, acetylacetonate, or the like. In such fashion stable lives of up to as long as a year can be attained.

By variations of the proportions of the components within the above limits, the physical character of the basic adhesive in the uncured state can be varied considerably, from a flowable liquid to a thick, highly viscous mass which is not readily susceptible to flow. Further control of such properties, as well as characteristics after cure may be attained by ancillary, or secondary additives, such as fillers, dyes, pigments, plasticizers, extenders, antioxidants, ultraviolet light stabilizers, and the like. Such materials will generally be limited in proportion to less than 100 weight percent, based on the weight of the basic adhesive composition.

THE INITIATOR COMPOSITION

Since the adhesive is stable and non-curing in the absence of an activator or initiator for the free radical catalyst system, a separate formulation of an appropriate activator is necessary for use of the adhesive. Desirably the activator component will be a tertiary amine, such as N,N-dimethyl aniline, N,N-diethyl aniline, N,N-dimethyl-p-toluidine, and the like. The activator may be supplemented by accelerators which function to increase the reaction rate of the adhesive cure. Such accelerators are most conveniently a source of a heavy metal, such as copper, iron, cobalt, manganese, lead, and the like, most desirably as an organo-metallic compound or salt wherein the heavy metal is oxidizable, i.e., not in its highest oxidation state.

The activator and (optional) accelerator selected for use will be formulated into a composition suitable for application to a substrate to be bonded with the adhesive. Activation of the free radical catalyst occurs upon contact of the adhesive with the activator, and by the use of such a system, no mixing or compounding of ingredients is required at the time and place of use.

Generally it will be preferred to formulate the activator (and accelerator) as a solution or dispersion in a volatile liquid carrier medium to facilitate application to the substrate. The solution or dispersion of the bonding activator or initiator in the solvent then can be applied, as by brushing, spraying, or the like, upon at least one surface to be bonded, and the solvent allowed to evaporate leaving a deposit of bonding activator (and, optionally, accelerator) on the surface. Because of the extremely rapid cure speed attainable from such a technique, it is usually preferable to apply the activator to only one of each pair of mating surfaces to be bonded, affording a slightly longer opportunity to manipulate and adjust the parts. It is however quite possible to apply the accelerator/activator combination or activator alone to each surface, then apply the adhesive to one or each, and then mate the surfaces. Such an operation offers some advantages, most notably a more uniform polymerization pattern, minimizing stresses in the bond and consequently stronger bonds. When the activator formulation is applied to only one surface, and the adhesive to the other, it is readily apparent that the adhesive activation does not occur until the mating surfaces are joined and the activator and the adhesive are brought into contact.

There is no necessity for mixing or combining the adhesive and its initiator or activator component, as the simple surface contact afforded by the foregoing procedure is fully adequate for the attainment of a full cure, even in the case of relatively thick layers of the adhesive. This is believed to be because the activation of the free radical catalyst system is transmitted as a "chain reaction" throughout the adhesive composition. Thus, while economics will ordinarily dictate the employment of the minimum amount of the adhesive necessary to attain a suitable bond, there are no limitations on the thickness of the adhesive bonding layer which may suitably be employed, although thickness will influence the cure rate.

In choosing the solvent for dissolution or dispersion of the bonding activator and accelerator, a solvent with a rapid rate of evaporation is desirable. This reduces the possibility of trapping solvent in the bonding accelerator-adhesive system during the bonding operation (which may tend to weaken the bond), and also avoids unnecessary delays to allow the solvent to evaporate before completing the bonding operation. While a large number of solvents are available for this purpose, the ones which have been found most useful are halogenated hydrocarbons, particularly chlorinated and/or fluorinated hydrocarbons, such as methylene chloride, trichloroethane, methylchloroform, and trichloromonofluoromethane, and lacquer type solvents, such as acetone, methyl ethyl ketone, methyl isobutyl ketone, and ethyl acetate. Other acceptable solvents are xylene, benzene and toluene. Nearly all of these solvents, and particularly the halogenated hydrocarbons, produce a secondary benefit in that they can serve to clean the area of the surface which is to be bonded, thus reducing the chance of weak bond formation.

Frequently a small amount of a second, or "mutual," solvent can be added to the system in order to aid in solubilizing or dispersing the bonding accelerator. Since nearly all of the bonding accelerators disclosed herein are soluble in alcoholictype solvents, such as ethyl alcohol, methyl alcohol, butyl alcohol and isopropyl alcohol, these have been found particularly adaptable to use as mutual solvents. Since many of these mutual solvents do not vaporize with the rapidity of the primary solvents, they should be used in as small an amount as possible, consistent with dissolving or dispersing the bonding accelerator. Preferably, the amount of mutual solvent should not exceed 15 percent by weight of the total amount of solvent in the system.

The amount of the bonding accelerator composition used in the solvent is limited only by its solubility characteristics in the solvent chosen. However, it is desirable to use a concentration which will produce optimum results during normal usage. If too little accelerator is applied, a maximum speed of cure will not be achieved. If excessive accelerator is applied, the accelerator can form a barrier to effective contact between the adhesive and the surface to be bonded, thus reducing the ultimate strength of the bond which is formed. Based on the method of common usage of such products, it has beem found preferable to use an accelerator concentration in the solvent of between about 0.01 percent and about 10 percent by weight, and preferably between about 0.2 percent and about 5.0 percent by weight.

The most highly preferred method of applying the bonding accelerator to the surface is from an aerosol container. In this manner a thin uniform film of the bonding accelerator is easily applied to the surface, and the maximum rate of solvent vaporization is achieved. Furthermore, more highly volatile solvents can be used under aerosol conditions than can be used conveniently in standard atmospheric pressure containers. Typical solvents within this category are dichlorodifluoromethane, vinyl chloride, and monochlorodifluoromethane. Upon release from the aerosol container, these solvents will evaporate exceedingly rapidly and thus shorten the time period between application of the bonding accelerator and completion of the bonding operation.

The amount of bonding accelerator to be applied to a given surface should be no more than necessary to obtain efficient acceleration of the bonding operation. Excess accelerator on one or more of the bonded surfaces can affect adversely the strength of the final bond. Further, when the amount of bonding accelerator exceeds about 20 percent by weight of the adhesive used, little if any additional increase in speed is noted. Generally, an amount of bonding accelerator equal to from about 0.05 to about 1.0 percent by weight of the adhesive is adequate. While it is not easy to determine the amount of accelerator applied to a given surface, adequate results are obtained with the single application, by aerosol or otherwise, of a thin film of the accelerator dissolved or dispersed in the appropriate solvent to the surfaces to be bonded.

While the bonding accelerator has been applied to the surface and the solvent, if any, has been allowed to evaporate, the bonding operation can proceed in the normal manner. The adhesive can be applied either to the surface which has been treated with the bonding accelerator or to the appropriate mating surface. Customarily, as with most bonding operations, a thin film of adhesive is most desirable. The two mating surfaces are then placed in abutting relationship, and, preferably, a moderate compressive force is applied to produce a relatively thin layer of adhesive between the two surfaces, spread the adhesive evenly between the surfaces, and thus maximize the bonding efficiency. Typically a thickness of adhesive between the surfaces of from about 0.0003 inch to about 0.040 inch is desirable. Such thicknesses generally can be achieved with the adhesives disclosed herein by the application of contact pressure, or if desired, a moderate compressive force, such as of from about 5 to about 50 pounds per square inch.

The time required for adhesive bonds in accordance with the present invention to set can be varied by appropriate selection of film thickness of the adhesive, catalyst, catalyst activator, accelerator, and the proportions thereof. If desired, set times of one second or even less, more frequently 10 seconds, may be attained, ranging upward to substantially as long a period as desired. Ordinarily, it will be preferred that set times be controlled to with a range of about 30 to 600 seconds, more preferably still about 30 to 120 seconds in the case of films of 1 mil or more. With thinner films, set times of 1 second or less, more frequently about 5–10 seconds are preferred. Extremely rapid curing formulations may have limited shelf life, but can be adequately handled and stored if refrigerated.

Bond strengths attained by the cured adhesive of the present invention are exceptional, both in shear strength and peel strength, to a wide diversity of substrates. In many cases it has been found possible to attain bonds having shear strengths greater than the coherent shear strength of the substrate. This is particularly true in the case of wood, glass, natural and synthetic rubber, and polyvinyl chloride. In some circumstances such results have been attained with other substrates, such as mild steel and the like. Bond shear strengths as high as about 4,000 p.s.i. and peel strengths of as high as about 90 p.l.i. have been attained, and in some cases have been even greater.

Among the substrates specifically evaluated to date, there may be mentioned steel, both clean and oily, as received from a mill, neither cleaned nor sanded, aluminum, wood, glass, polyvinyl chloride, nylon, polystyrene, glass-reinforced polyester, polyester films, such a Mylar, surface activated polyolefins and poly (tetrafluoroethylene), such as Teflon, ABS, natural rubber, SBR rubber, neoprene rubber, hot galvanized steel, electrogalvanized steel. Bond strengths in shear qualify as very high with all these materials except hot galvanized steel, although the results attained with this substrate are better than is normally attained in the art.

Peel strength of the adhesive bonds formed in accordance with the present invention is exceptionally high, surprisingly so in combination with the high shear strength of the bonds, as these two measures of bond strength properties are ordinarily considered mutually conflicting, in the sense that improvement in one is normally at the expense of the other. Bond peel strength values for the adhesive formulated and applied in accordance with the present invention range from 25 to 90 pounds per linear inch, at a rate of 0.1 inch per minute.

It has been found that the excellent bond characteristics attained by the adhesive of the present invention are rapidly degraded at temperatures above 150° C. When service is contemplated for environments below this temperature, such heat sensitivity is of little consequence and can generally be ignored. For applications where temperature exposure of 150° C. or above, even for relatively brief periods of 15 to 20 minutes, as in industrial paint-baking procedures or the like, is contemplated, it is necessary to add to the basic adhesive formulation a high temperature bond stabilizer comprising about 2 to 20, preferably about 5 to 15, and most preferably about 6 to 12, weight percent, based on the weight of the adhesive, of an epoxide resin not reactive with any component of the adhesive formulation.

Epoxide resins are also known as polyepoxide resins or epoxy resins and are characterized by having epoxy chemical groups,

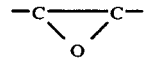

wherein an oxygen atom is joined to each of two carbon atoms which are already united in some other way. Epoxy resins which contain the epoxy groups can be saturated or unsaturated, aliphatic, cycloaliphatic, aromatic or heterocyclic and can be substituted, if desired, with other substituents, such as chlorine atoms, hydroxyl groups, ether radicals, and the like. They can also be monomeric or polymeric. Other examples of epoxy resins include epoxidized esters of unsaturated monocarboxylic acids, epoxidized esters of unsaturated monohydric alcohols and polycarboxylic acids, epoxidized esters of unsaturated alcohols and of unsaturated carboxylic acids, epoxidized polymers and copolymers of diolefins, and the like. Epoxy resins preferred for use in the present invention include glycidyl esters and glycidyl ethers. Specific epoxy resins especially preferred in the present invention include diglycidyl ethers of bisphenol A both alone and diluted with other glycidyl ethers such as butyl glycidyl ether or phenol glycidyl ethers; epoxidized oils such as epoxidized soybean oil and the diglycidyl ester of linoleic acid; the triglycidyl ethers of glycerol and trimethylolpropane, triglycidyl p-aminophenol and, specifically, materials such as 3,4-epoxy-6-methylcyclohexylmethyl-3,4-epoxy-6-methylcyclohexane carboxylate and 3,4-epoxycyclohexylmeth-yl-3,4-epoxycyclohexane carboxylate and bis(3,4-epoxy-6-methylcyclohexylmethyl)adipate.

When the epoxide resins are incorporated into the basic adhesive, bond strengths before exposure to high temperature are occasionally slightly inferior to the adhesive with no epoxide resin added, but after exposure to temperatures above 150° C., the bond strengths are dramatically higher for the epoxide resin containing formulations.

EXAMPLES

The following specific examples are intended to illustrate the present invention for the benefit and guidance of those of ordinary skill in the art, but are not intended to be limiting upon the scope of the invention, as the ordinary level of skill in the art will lead to many adaptations and variations of the invention to specific utilizations in accordance with known principles and techniques and the specific requirements of a particular utility. It is accordingly intended that the scope of the present invention be defined only by the claims hereinafter appended hereto.

EXAMPLE I

The Adhesive

Thirty three grams of a polyester-based polyurethane resin, Estane 5712, a commercially available product of B. G. Goodrich Co., Inc., containing no free isocyanate groups, was dissolved in a mixutre of thirty three grams of acrylic acid and thirty four grams of methyl methacrylate. After the resin was dissolved, five grams of benzoyl peroxide and 0.1 grams of hydroquinone were stirred into the mix until dissolved.

The foregoing adhesive solution was divided into two equal portions, one of which was stored in a closed polyethylene container at ambient conditions, while the other portion was tested as an adhesive in the following procedure.

The Activator

Dimethyl aniline was dissolved in methanol to form a 10 weight percent solution. The solution was packaged in a polyethylene bottle with a plunger operated sprayer.

The Procedure

An oily steel sheet, as received from the mill and not cleaned or sanded, was cut into two strips, 12 inches × 2 inches × ¼inch. One half the length of one of the strips was coated on one face with a 10 mil layer of the adhesive described above. The other strip was lightly sprayed over half the length of one face with the above activator solution. After standing for two minutes, the methanol had evaporated and an invisible "film" of the dimethyl aniline remained on the surface. The coated portions of the two strips were then placed together under contact pressure.

The time was noted when it was no longer possible to move the two strips relative to one another by hand, and was designated as the "set time." In the operation just described the set time for eight replications varied from 60 to 75 seconds.

Two of the eight samples thus formed were tested to ascertain bond shear strength and bond peel strength. The shear strength was 3,200 p.s.i. and peel strength was 25–30 p.l.i.

The remaining six samples were heated to various temperatures where they were maintained for 20 minutes, allowed to cool to ambient, and the shear strength of each was determined. The results were those shown in Table I:

TABLE I

| Sample | 3 | 4 | 5 | 6 | 7 | 8 |
|---|---|---|---|---|---|---|
| Baking Temperature, °C. | 25 | 75 | 125 | 150 | 175 | 200 |
| Shear strength, p.s.i. | 3200 | 2750 | 2000 | 1800 | 370 | 80 |

It will be observed that each of sampled 4–8 show at least some degradation, but the values are adequate for most utilities for baking temperatures of 150° C. and lower.

The same formulations and the same procedure were employed with a plurality of different substrates. The results are shown in Table II.

TABLE II

| Substrate | Shear Strength (P.S.I.) |
|---|---|
| Steel/Steel (Clean) | 3800 |
| Aluminum/Aluminum | 3100 |
| Wood/Wood | >1800 (Wood failed) |
| Steel/Glass | >800 (Glass failed) |
| Steel/PVC | >2600 (PVC failed) |
| Steel/GRP | 2750 |
| Steel/Nylon | 2980 |
| Steel/Polystyrene | 2420 |
| Steel/ABS | 2480 |
| Steel/Natural Rubber | 600 (Rubber failed) |
| Wood/ABS* | 600 |
| Hot Dip Galvanized Steel/Steel | 420 |
| Electro Galvanized Steel/Steel | 1800 |

*Activator applied to wood resulted in bond failure; repeated with activator applied to ABS, bond survived to wood failure at 1800 p.s.i.

EXAMPLE II

The procedure of Example I was repeated utilizing clean steel substrates and varying the adhesive formulation by altering the relative proportions of the acrylic acid and methyl methacrylate. All other components of the adhesive remained the same as did the activator composition. The monomer variation and results thereof are shown in Table III.

TABLE III

| | Steel/Steel Bonds | | |
|---|---|---|---|
| | | Bond Value (PSI -Shear) | |
| Acrylic Acid (%) | Set Time (Secs.) | Room Temp. | After 20 Mins. at 175° C |
| 0 | >600 | 1280 | 60 |
| 5 | 600 | 1260 | 70 |
| 10 | 300 | 1380 | 280 |
| 15 | 175 | 2040 | 305 |
| 20 | 170 | 2400 | 310 |
| 25 | 150 | 2800 | 310 |
| 30 | 120 | 3200 | 320 |
| 67 | 105 | 3500 | 330 |

EXAMPLE III

The procedure of Example I was again repeated with clean steel substrates and, as in Example II utilizing varying proportions of acrylic acid and methyl methacrylate, and additionally adding to the adhesive up to 18 weight percent of an epoxide resin, Epon 828 (Shell Oil Company). The results are shown in Table IV:

TABLE IV

| | | Heat Resistant Adhesives | | |
|---|---|---|---|---|
| | | | Bond Values (PSI-Shear) | |
| Acrylic Acid (%) | Epoxide Resin % | Set Time (Secs.) | Room Temp. | After 20 Mins. at 175° C. |
| 30 | 0 | 120 | 3200 | 320 |
| 30 | 6 | 120 | 3200 | 1080 |
| 30 | 12 | 120 | 3250 | 1140 |
| 30 | 18 | 120 | 3250 | 1150 |
| 20 | 0 | 170 | 2400 | 310 |
| 20 | 6 | 170 | 2450 | 1100 |
| 20 | 12 | 120 | 2500 | 1180 |
| 20 | 18 | 120 | 2500 | 1220 |
| 10 | 0 | 300 | 1140 | 280 |
| 10 | 6 | 300 | 2420 | 3500 |
| 10 | 12 | 300 | 2500 | 2420 |
| 10 | 18 | 300 | 2200 | 1600 |
| 5 | 0 | 600 | 1260 | 70 |
| 5 | 6 | 600 | 1320 | 1000 |
| 5 | 12 | 600 | 1300 | 980 |
| 0 | 0 | 920 | 1280 | 60 |
| 0 | 6 | 950 | 1280 | 60 |

It is readily apparent that the epoxide resin has a substantial and dramatic effect upon the temperature and heat resistance of the adhesive bonds. It is of interest to note that results are best when the proportions of the epoxide resin and the acid monomer are approximately equal, and in this context it is preferred to employ relatively lower proportions of both these components because of the considerable expense involved.

EXAMPLE IV

Variations in the nature of the epoxide resin were investigated by formulating an adhesive of 33 percent of the Estane 5712 polyurethane, 46 percent methyl methacrylate, 10 percent acrylic acid, 5 percent benzoyl peroxide, and 6 percent of various epoxide resins. The activator was the same as that employed in Example I, and the same procedure was followed utilizing clean steel substrates. The epoxide resins employed were all commercial products obtained from Shell Oil Company. The results obtained with each are shown in Table V.

TABLE V

| Epoxy | Set Time (Secs.) | Initial | After 20 Mins. at 175° C. |
|---|---|---|---|
| Epon 828 | 300 | 2420 | 3500 |
| Epon 834 | 305 | 2480 | 3450 |
| Epon 1001 | 308 | 2400 | 3150 |
| Epon 1007 | 305 | 2460 | 3120 |

It is apparent that such variations in the epoxide resin are not narrowly significant to the results obtained.

EXAMPLE V

The adhesive of the present invention was formulated with a variety of acid monomers to show the effect upon results of this variable. A variety of acid monomers were employed in the adhesive which was otherwise not varied. The various adhesives thus formulated were evaluated for set time, bond shear strength, and a subjective measure of odor level. Acrylic acid has a sharp pungent odor and was assigned a rating of "0," while an adhesive with no acid monomer present was assigned a rating of "10."

|  | wt. % |
|---|---|
| Polyurethane resin (Estane 5712) | 30 |
| Methyl methacrylate | 35 |
| Acid monomer | 30 |
| Benzoyl peroxide | 5 |

It should be noted that maleic acid was employed as the half ester of 2-hydroxyethyl acrylate because, despite being a common addition polymerizable monomer in many systems, maleic anhydride is not soluble in or compatible with methyl methacrylate, while the half ester is freely soluble.

Three acids which are not polymerizable monomers in the adhesive were also included for purposes of comparison with the acid monomers of the present invention. Phosphoric, citric, and benzoic acids were chosen as fairly representative of non-monomer acids, both mineral and organic.

The substrate for this example was oily steel as received from the mill, not otherwise cleaned or sanded. The activator was that of Example I, and the procedure followed that of Example I as well. The results are shown in Table VI.

TABLE VI

Acid Catalysts for Monomer/Polymer Systems (30% Acid/30% Estane 5712/35% Methyl Methacrylate/5% Benzoyl Peroxide)

| Acid | Set Time (Secs.) | Shear (PSI) | Odor |
|---|---|---|---|
| Acrylic | 120 | 3200 | 0 |

TABLE VI-continued

Acid Catalysts for Monomer/Polymer Systems (30% Acid/30% Estane 5712/35% Methyl Methacrylate/5% Benzoyl Peroxide)

| Acid | Set Time (Secs.) | Shear (PSI) | Odor |
|---|---|---|---|
| Methacrylic | 360 | 3180 | 1 |
| Phosphoric | >600 | 60 | 1 |
| Citric | >600 | 1680 | 10 |
| Benzoic | >600 | 1700 | 10 |
| *Maleic Anhydride | 260 | 2980 | 9 |
| *Itaconic | 320 | 2950 | 9 |
| *Fumaric | 330 | 2980 | 9 |
| *Oxalic | 300 | 2860 | 9 |
| *Terephthalic | 310 | 2940 | 9 |
| *Phthalic | 290 | 2900 | 9 |

*Half ester of 2-hydroxyethyl acrylate

EXAMPLE VI

Metal ions as naphthenates were tested as accelerators with dimethyl aniline. They were used at different concentrations with an adhesive base composed of 30% acrylic acid, 30% Estane 5712, 35% methyl methacrylate and 5% benzoyl peroxide. The results of set time are listed in Table VII.

TABLE VII

Effect of Metal Ions on Set Time of Dimethyl Aniline Activation of a monomer Polymer Adhesive

| Metal Ion | Conc. | Set Time (Secs.) |
|---|---|---|
| None | — | 120 |
| Cobalt | .01 | 100 |
| Cobalt | .1 | 90 |
| Cobalt | 1 | 65 |
| Iron | .01 | 98 |
| Iron | .1 | 90 |
| Iron | 1 | 63 |
| Copper | .01 | 97 |
| Copper | .1 | 86 |
| Copper | 1 | 68 |
| Manganese | .01 | 110 |
| Manganese | .1 | 95 |
| Manganese | 1 | 87 |

EXAMPLE VII

The formulation of the adhesive of Example I was repeated, omitting the hydroquinone. It, together with the packaged increment of Example I adhesive, were stored on a dark shelf at ambient temperatures and were periodically examined for gelling. The uninhibited formulation without the hydroquinone was observed to set to a hard gel in about two months. After 6 months the inhibited formulation still showed no sign of gel formulation.

EXAMPLE VIII

Variability of the polyurethane component was examined by repetition of the procedure of Example I employing a fixed formulation of 30% polyurethane, 30% acrylic acid, 35% methyl methacrylate, and 5% benzoyl peroxide; the activator formulation was the same as in Example I.

A variety of polyurethanes were employed in the formulation, employed to bond clean steel with the results as shown in Table VIII.

TABLE VIII

| Polyurethane | | Shear Strength, psi | Peel Strength, pli |
|---|---|---|---|
| Estane | 5711 | 3000 | 60 |
| | 5712 | | |
| | 5713 | 2790 | 75 |

TABLE VIII-continued

| Polyurethane | | Shear Strength, psi | Peel Strength, pli |
|---|---|---|---|
| | 5703 | 3150 | 60 |
| | 5715 | 2982 | 45 |
| Adiprene | CM (1) | 2640 | 31 |
| | L-315 | 1320 | 12 |
| | L-42 | 2600 | 30 |
| | L-100 | 1800 | 31 |
| Multron | | 2800 | 45 |
| U.C. polycaprolactone/MDI | | 3800 | 67 |
| Cyanaprene | A-8 | 2840 | 50 |
| | A-9 | 1500 | 40 |
| | A-85 | 2900 | 28 |
| | D-5 | 2300 | 24 |
| | D-6 | 2400 | 27 |
| | D-7 | 1950 | 13 |

(1) Adiprene CM contains free isocyanate groups which were capped by recation with ethanol.

The Estane polyurethanes are products of B. F. Goodrich of proprietary formulation; numbers 5711 and 5712 are, insofar as known, of tetramethylene glyol ethers or varying molecular weight and methylene diisocyanate. Number 5713 is a polymer of polypropylene glycol ether and methylene diisocyanate. Numbers 5703 and 5715 are formed from polyethylene glycol ethers and p,p'diphenylmethane diisocyanate.

The Adiprenes are products of duPont, and are similarly proprietary. It is known that all are polymers of tetramethylene ether, extended with butylene glyol, reacted with p,p'-diphenylmethane diisocyanate.

Multron is a product of Mobay, a polyester based polyurethane from polyethylene adipate and toluene diisocyanate.

The Union Carbide polyurethane is formed from polycaprolactone and p,p'-diphenylmethane diisocyanate.

The Cyanaprenes are proprietary products of American Cyanamid, and are all based on polymethylene glycol ethers and p,p'-diphenylmethane diisocyanate.

EXAMPLE IX

The effect of the thickness of the adhesive film was investigated by the procedure of Example I. Clean steel was bonded with varying thicknesses of an adhesive formulated of 30% Estane 5712 polyurethane, 30% acrylic acid, 35% methyl methacrylate, and 5% benzoyl peroxide.

The film thicknesses and results are shown in Table IX.

TABLE IX

EFFECT OF ADHESIVE THICKNESS

| Adhesive Thickness (MILS) | Set Time (SECONDS) | Shear Value PSI | Peel Value PLI |
|---|---|---|---|
| 0.1 | 3 | 305 | 12 |
| .4 | 8 | 1205 | 16 |
| .6 | 12 | 1420 | 16 |
| .9 | 15 | 1840 | 18 |
| 1.0 | 15 | 2480 | 28 |
| 1.4 | 40 | 2860 | 30 |
| 2.0 | 65 | 3240 | 35 |
| 3.0 | 120 | 3350 | 35 |
| 4.5 | 120 | 3350 | 37 |
| 7.8 | 120 | 3400 | 35 |
| 10.0 | 120 | 3400 | 35 |
| 15.0 | 135 | 3400 | 35 |
| 25.0 | 135 | 3375 | 35 |
| 40.0 | 200 | 3400 | 35 |

TABLE X

EFFECT OF HEAT ON FORMATION OF BOND
(Decreased "Set Time")

| Temperature (° F.) | Set Time (Seconds) |
|---|---|
| 75 | 180 |
| 125 | 31 |
| 160 | 15 |
| 200 | 6 |

An area of particular utility of adhesives in accordance with the present invention is in the formation of metal-to-metal adhesive joints in the manufacture of articles and bodies of sheet metal and the like. Of particular interest are the manufacture of metal containers, such as cans and the like.

Adhesively bonded or cemented, as opposed to soldered or welded, side seam bodies are per se known in the art. Cans and containers from such bodies have found a degree of commercial success for packaging of some products, but is generally limited to those which generate no substantial internal pressure, such as frozen fruit concentrates, household cleaners and polishes, and the like. One of the major commercial attractions and selling features of such can bodies is that it is possible to provide decorations and labeling printed directly upon the can body, as opposed to paper labels, extending completely around the external surface of the can body. However, it has not proved possible with such prior art cemented side seam bodies to attain sufficient bursting strength for general use, particularly when the can is subjected to conditions necessary to process many products, such as sterilization cooking for fruits and vegetables, or pasturization of beer and the like. Subjection of such side seam bodies to high temperatures and/or high internal pressures have led to a very high incidence of failure in the adhesively bonded side seams.

The very high strength adhesives known to the art have not heretofore been successful adapted to use in the manufacture of can bodies having adhesively bonded side seams for a number of reasons. Some of the major reasons for the failure to make successful adaptations are that although such adhesives attain excellent cohesive strength, they have proved woefully deficient in the attainment of reliable adhesion to metal surfaces, or even to coatings or primers applied to sheet metal surfaces for making can bodies. The expedients required to attain sufficient adhesion to the metal surfaces have proved prohibitively expensive and/or slow. Another serious drawback to the use of high strength adhesives has been the prolonged bonding or setting time required, on the order of minutes or hours, and far longer than acceptable in high speed can making operations which require the attainment of sufficient bond strength to hold the can body together in a matter of a few seconds. Many high performance adhesives also require rather high temperatures and pressures during the setting period, which adds considerably to the equipment requirements and operating expense, and cause further delays in the operations. An associated problem has been the presence of components in such adhesives which are dissolved by the contents packaged in the cans which, on the one hand many cause bond failure and leakage, and on the other hand may lead to the introduction of toxic materials into the packaged contents. In either case, such results are clearly not acceptable.

As a consequence of the many deficiencies of adhesive bonding in such a context, the art remains primarily committed to soldered and welded joints and seams. Such operations are capital intensive, requiring complex and expensive machines, and are also expensive to operate, requiring highly skilled operators, high maintenance costs, and large amounts of increasingly expensive energy, particularly electrical energy.

All these disadvantages and problems are overcome by forming such joints by the composition and technique of the present invention. As already noted, the adhesive of the present invention is readily cured to extremely rapid setting time and results in high bond strengths well adapted to the formation of can bodies and the like. High temperatures and pressures are not required; nor is it necessary to resort to expensive and complex surface preparation in order to attain satisfactory bonds. The cured adhesive contains no toxic ingredients and is wholly compatible with the packaging of foods and the like, and contains no soluble components so that the bond is secure even upon exposure to solvents and the like. When sterilization, pasteurization, or other procedures conducted at elevated temperatures are required, bond strength is preserved as hereinabove shown. The adhesive of the present invention is effective in such a context whether the bonding surface is bare metal, such as aluminum or steel, or coated or primed with another material. Because the bond is attained at ambient temperatures and under the normal pressures incident to joint forming operations, the equipment requirements are surprisingly modest, and a labor force with specialized skills and high energy costs are avoided. Bond strengths which exceed the rupture strength of the sheet metal employed are readily attained, and are retained at such levels even after high temperature processing operations, which is, of course, entirely adequate.

The sheet metals employed in making "tin" cans are generally aluminum or low carbon steel, with or without an external surface plating of aluminum, chromium, nickel, or tin, or the like. Such cans are generally formed from metal sheets having a thickness on the order of about ten thousandths of an inch.

While the formation of side seams in tubular can bodies is a particularly preferred and advantageous mode of practice of the present invention, it should be understood that such operations are typical of a wide variety of manufactures wherein the present invention may be employed to excellent advantage and it is accordingly not intended to limit or restrict the present invention to such narrow context, but rather to utilize the particularly demanding context of side seam bonding as a preferred field of use and as exemplification of such bonding operations generally wherein the present invention will find use to good advantage. By virtue of the description of side seam bonding operations, those of ordinary skill in the art will be able to adapt the practice of the present invention to a variety of other fields and utilizations without difficulty.

An appropriate sheet metal strip having a width appropriate to the formation of a tubular can body, including marginal portions adapted to form a side seam is formed into a tubular can body usually by forming on a mandrel or the like on a high speed, automatic can body machine or the like. In some operations, the sheet metal strip is cut to length before forming, while other machines may form a continuous length of sheet metal tube which is thereafter cut to the chosen length. The term tubular may mean cylindrical, which is most frequently the case, but also includes oval or more-or-less rectangular cross-sections and the like as well. The forming machine may be adapted to form a simple lap joint or, if desired, a more complex folded or rolled joint may be so formed in the fashion known to those of ordinary skill in the art. Such forming operations and machines adapted thereto are familiar and do not per se form any part of the present invention. Such operations are preferably performed at a high rate, for example, on the order of about two hundred fifty can bodies per minute or even more.

For the employment of the present invention, means are provided, either as a part of such forming machines or as a prior operation as is most convenient, for applying the initiator or activator formulation to at least one of the surfaces of the side seam to be formed, and separate additional means to apply the adhesive formation to at least one of the said surfaces; thus as an integral part of the tubular can body forming operation the side seam is formed and adhesively bonded in extremely rapid fashion at the same rate as the operation of the forming machine.

To facilitate the extremely high rate, it will be, of course, preferred to utilize the faster curing versions of the adhesive of the present invention. Thus, in particular, it will be preferred in accordance with the foregoing portions of the disclosure and prior example, an accelerator for the cure in the activator component. In addition, the bond formation rate can be further accelerated if decided if both the bonding surfaces of the seam are coated with the accelerator-containing activator component and both bonding surfaces are thereafter coated, i.e. over-coated with the adhesive component and the cure initiated prior to the mating of the bonding surfaces of the seam. By such a technique the cure can proceed even more effectively, since, although there is a limit to the cure rate, cure can proceed to a substantial degree toward completion outside the forming machine, dramatically reducing contact time required to set the adhesive bond. By virtue of such an expedient, forming contact pressures can effectively form the adhesive bond with residence times of a second or, in cases where substantial care is taken, to substantially less them a second. Such formulations may require refrigeration for long term storage, as more active formulations are generally required. Since the sequential operations of conventional tubular can body forming machines are ordinarily conducted in different locations in the machine, with several can bodies, or a length of tubular member equivalent to several can bodies, being operated upon at one time, residence rates within the operating confines of the apparatus are several times longer than the through-put rate. This affords a sufficient period for bond formation in accordance with the present invention at full-speed operation of conventional forming machines.

The seam forming surfaces of the sheet metal strip, or blanks cut therefrom can be treated with the activator component at a substantial period before forming. This facilitates evaporation of any solvent employed as a carrier therefor. A similar, leisurely application of the inactive adhesive can be employed when it is to be applied to an activator-free surface. However, such a convenience is not appropriate when all the bonding surfaces are accelerated and activated, and application of the adhesive must then be deferred until just prior to formation of the seam to be bonded.

The accelerated activator composition is applied by any convenient technique, such as spraying, brushing, wicking, roller application, dipping, or the like. When the sheet metal is available in the form of a long roll of appropriate width, it will be most convenient to dip the side of the roll into a shallow bath of the activator, then allowing the roll to drain and dry. If both edges are to be activated, a double dipping operation will, of course, be required. Many variations of technique will occur to those of ordinary skill in the art, and any effective technique may be chosen on the basis of economy and convenience.

Application of the adhesive component will ordinarily be somewhat more complex and demanding because of the customary requirements for a very high rate, the need to control cure time in conjunction with the seam forming operation, and the greater viscosity of the adhesive component. Thus, the dipping operation will not often be acceptable, and it will generally be necessary to utilize a different technique. At the high rates involved in feeding the sheet metal to the forming maching, which may run as high as several thousand feet per minute in some cases, it will generally be preferred to apply the adhesive composition by roller printing, by pressure feed to a doctor blade, or where the viscosity is sufficiently low, to a doctor blade, or where the viscosity is sufficiently low, as a spray.

The application of the adhesive formulation to activated surfaces of the sheet metal, when that expedient is employed, should be located so that the time of transit from that point to the point at which the seam forming contact is first made is about ninety, or even ninety-five percent of the adhesive set time. Thus, the contact residence time in the forming machine need be only one-tenth or less of the adhesive set time in order to form a bond.

This feature of the invention is believed, although applicant has no wish to be bound by such belief, to be possible because of the activation of the adhesive at its contact surface with the sheet metal substrate, rather than by an activator dispersed throughout the adhesive layer. In this fashion, the curing reaction begins immediately at the metal-adhesive interface, and is transmitted through the adhesive layer to the open face, so that the portion of the adhesive layer at and near the open face is activated and proceeding to cure at the time the opposing faces are joined in their desired mating relationship. Thus, the time required to complete formation of the initial set of the joint bond is at or very near a minimum.

When such an expedient is relied upon, some measure of care must be taken to insure that the time between activation and contact is neither too brief nor to lengthy. If the "lead" time is too short, the tubular can body may exit the forming machine before the bond is adequately set, and bond failure may result. If, on the other hand, the lead time is too long, the adhesive may cure to a non-tacky or non-adhesive state before the joint is formed, in which case a poor bond, or in extreme cases, no bond at all may form.

In accordance with the foregoing disclosure, it will be recalled that the activator component is to be applied very lightly. Ordinarily a thin film of substantially less than one mil will be appropriate, such as 0.01 to 0.5 mil, preferably about 0.05 to 0.1 mil. Generally, the least amount consistent with an adequate level of activation of the cure catalyst is desired. Excessive amounts are to be avoided as the formation of a continuous "film" may create a barrier to the formation of an adhesive bond.

The adequate component is not narrowly critical in amount, although it should be applied in an amount sufficient to insure substantially continuous bonding contact with the substrate. A practical lower limit, both from the foregoing requirement, as well as the practical considerations of technique of application will be a layer of about 0.0003 (0.3 mil). There is no functional upper limit to the thickness of the adhesive layer, but economics and practicality usually dictate that the minimum necessary be employed. Thus the adhesive component will ordinarily be applied as a layer of about 0.3 to 1.5, preferably about 0.5 to 1.0 mils, in the context of the formation of tubular can bodies intended for light duty, such as beer and soft drink cans. Where heavier loadings are contemplated, as in the case of very large cans and/or cans intended for industrial products, paint cans or the like, a thicker layer of adhesive will ordinarily be appropriate, on the order of about 0.75 to 2.0 mils, preferably about 1.0 to 1.5 mils. Note bene that where the adhesive is applied to both mating surfaces of the side seam joint, about one half the foregoing amounts should be applied to each surface.

It will be found that the bonds formed in accordance with the foregoing, even in the case of simple lap joints, not folded, rolled, or otherwise altered, will often have a joint strength greater than the rupture strength of the sheet metal in gauges common to the manufacture of tubular can bodies. This bond strength will, in most cases, eliminate the requirement for folding or rolling side seam joints at all, resulting in still greater savings in equipment and operating cost. The operations in accordance with the present invention are, however, by no means incompatible with rolled and/or folded side seam joints, and such construction may be employed if desired, which may be the case when exceptionally heavy gauge metal is employed and/or when exceptionally high internal pressures are contemplated.

Where high temperature procedures are contemplated, it will, of course, be appropriate to take such factors into account when formulating the adhesive component, and accordingly to include the optional epoxide resin into the adhesive.

On the other hand, it is also possible to facilitate metal recovery and reclaiming operations for used cans by choosing to omit the epoxy constituent, permitting bond degradation with reduced heat input at lower operating operations. Such an expedient should, however, be employed only when end seals of the cans are similarly degradable, as side seam failure alone is not fully effective to "dismantle" the cans.

The adhesively bonded side seams in accordance with the foregoing description result in tubular can bodies which may be employed with conventional end caps, applied in known and familiar fashion, or with end caps applied and sealed by an adaptation of the present invention, in fashions readily apparent to those of ordinary skill in the art in light of the foregoing description.

EXAMPLE X

The formation of an adhesive bonded can body side seam in accordance with the present invention was conducted by forming and bonding a 5 to 6 mil sheet stock of tin free steel of the type known in the art as "black inon". The seam was a simple lap joint, having an overlap of three sixteenths inch.

One of the bonding surfaces was activated with a 0.01 mil layer of dimethyl aniline, while the other mating surface was coated with a 0.3 mil adhesive formulated as follows:

| | |
|---|---|
| Polyurethane (Estane 5712) | 30 parts by weight |
| Methyl methacrylate | 31 |
| Acrylic acid | 12 |
| Acrylamide | 10 |
| Benzoyl peroxide | 5 |
| Epoxide resin (Epon 828) | 12 |

When the surfaces were joined, set time was found to be less than one second and bond shear strength evaluation resulted in failure of the metal at about 500 p.s.i. with the bond intact. Peel strength of the bond was 32 p.l.i., far in excess of the standard specification of 18 p.l.i.

Subjection of the bonded joint to boiling water for extended periods resulted in no measurable changes in bond strength values and no detectable extraction of any material from the cured adhesive.

It will be readily apparent to those of ordinary skill in the art that variations and adaptations are possible, so that with the guidance afforded by the foregoing disclosure and specific examples the adhesive and the technique of adhesive bonding of the present invention can be readily and effectively employed for a large number of particular utilizations. Such disclosure and examples are intended to inform and enable those of ordinary skill in the art to practice the invention, but should not be construed as limiting upon the scope of the invention defined in and by the claims appended hereto.

What is claimed is:

1. An activatable, curable adhesive comprising a solution of a non-reactive thermoplastic polyurethane polymer resin dissolved in a free radical addition polymerizable acrylic monomer and a free radical addition polymerizable acid monomer co-polymerizable with said acrylic monomer, said solution containing a catalytically effective amount of a non-activated free radical addition polymerization catalyst having a half-life of at least about one-half hour at 85° C.

2. The activatable, curable adhesive of claim 1 wherein said adhesive comprises from about 10 to 70 weight percent of said polyurethane resin, from about 5 to 67 weight percent of said acrylic monomer, from about 5.0 to 67 weight percent of said acid monomer, and about 0.1 to 5.0 weight percent of said polymerization catalyst.

3. The activatable, curable adhesive of claim 1 wherein said adhesive comprises from about 20 to 50 weight percent of said polyurethane resin, from about 20 to 40 weight percent of said acrylic monomer, from about 5.0 to 35 weight percent of said acid monomer, and about 0.5 to 2.0 weight percent of said polymerization catalyst.

4. The activatable, curable adhesive of claim 1 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

5. The activatable, curable adhesive of claim 1 wherein said acid monomer is selected from the group consisting of acrylic acid, methacrylic acid, the hydroxyethyl acrylate half esters of maleic, itaconic, fumaric, oxalic, terephthalic, and mixtures thereof.

6. The activatable, curable adhesive of claim 1 wherein said polymerization catalyst is benzoyl peroxide.

7. The activatable, curable adhesive of claim 1 wherein said adhesive is activatable by contact with a free radical addition polymerization catalyst activator.

8. The adhesive of claim 7 wherein said catalyst activator is selected from the group consisting of dimethyl aniline, diethyl aniline, N,N-dimethyl-p-toluidine, and mixtures thereof.

9. The adhesive of claim 1 wherein said acrylic monomer is selected from the group consisting of methyl methacrylate, ethyl acrylate, n-butyl acrylate, acrylamide, methacrylamide, and mixtures thereof.

10. The adhesive of claim 1 wherein said acid monomer is selected from the group consisting of acrylic acid, methacrylic acid, and mixtures thereof.

11. An activatable, curable adhesive comprising a solution of a non-reactive thermoplastic polyurethane polymer resin and a non-reactive epoxide resin dissolved in a free radical addition polymerizable acrylic monomer and a free radical addition polymerizable acid monomer copolymerizable with said acrylic monomer, said solution containing a catalytically effective amount of non-activated free radical addition polymerization catalyst having a half-life of at least about one-half hour at 85° C.

12. The activatable, curable adhesive of claim 11 wherein said adhesive comprises from about 10 to 70 weight percent of said polyurethane resin, from about 5 to 67 weight percent of said acrylic monomer, from about 5.0 to 67 weight percent of said acid monomer, and about 0.1 to 5.0 weight percent of said polymerization catalyst.

13. The activatable, curable adhesive of claim 11 wherein said adhesive comprises from about 20 to 50 weight percent of said polyurethane resin, from about 20 to 40 weight percent of said acrylic monomer, from about 5.0 to 35 weight percent of said acid monomer, and about 0.5 to 2.0 weight percent of said polymerization catalyst.

14. The activatable, curable adhesive of claim 11 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

15. The activatable, curable adhesive of claim 11 wherein said acid monomer is selected from the group consisting of acrylic acid, methyacrylic acid, the hydroxyethyl acrylate half esters of maleic, itaconic, fumaric, oxalic, terephthalic, and mixtures thereof.

16. The activatable, curable adhesive of claim 11 wherein said polymerization catalyst is benzoyl peroxide.

17. The activatable, curable adhesive of claim 11 wherein said adhesive is activatable by contact with a free radical addition polymerization catalyst activator.

18. The adhesive of claim 17 wherein said catalyst activator is selected from the group consisting of dimethyl aniline, diethyl aniline, N,N-dimethyl-p-toluidine, and mixtures thereof.

19. The adhesive of claim 11 wherein said acrylic monomer is selected from the group consisting of methyl methacrylate, ethyl acrylate, n-butyl acrylate, acrylamide, methacrylamide, and mixtures thereof.

20. The adhesive of claim 11 wherein said acid monomer is selected from the group consisting of acrylic acid, methyacrylic acid, and mixtures thereof.

21. The activatable, curable adhesive of claim 11 wherein said epoxide resin is not reactive with any component of the adhesive.

22. A method of adhesively joining a pair of mating surfaces comprising applying to at least one of said mating surfaces a free radical addition polymerization catalyst activator in a sufficient amount to activate a free radical addition polymerization catalyst by contact, applying to at least one of said mating surfaces an activatable, curable adhesive comprising a solution of a non-reactive thermoplastic polyurethane polymer resin dissolved in a free radical addition polymerizable acrylic monomer and a free radical addition polymerizable acid monomer co-polymerizable with said acrylic monomer, said solution containing a catalytically effective amount of a non-activated free radical addition polymerization catalyst having a half-life of at least about one-half hour at 85° C., joining said pair of mating surfaces in a contact relationship, and maintaining said contact relationship until said adhesive cures to a set.

23. The method of claim 22 wherein said adhesive comprises from about 10 to 70 weight percent of said polyurethane resin, from about 5 to 67 weight percent of said acrylic monomer, from about 5.0 to 67 weight percent of said acid monomer, and about 0.1 to 5.0 weight percent of said polymerization catalyst.

24. The method of claim 22 wherein said adhesive comprises from about 20 to 50 weight percent of said polyurethane resin, from about 20 to 40 weight percent of said acrylic monomer, from about 5.0 to 35 weight percent of said acid monomer, and about 0.5 to 2.0 weight percent of said polymerization catalyst.

25. The method of claim 22 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

26. The method of claim 22 wherein said acid monomer is selected from the group consisting of acrylic acid, methacrylic acid, the hydroxyethyl acrylate half esters of maleic, itaconic, fumaric, oxalic, terephthalic, and mixtures thereof.

27. The method of claim 22 wherein said polymerization catalyst is benzoyl peroxide.

28. The method of claim 22 wherein said adhesive is activatable by contact with a free radical addition polymerization catalyst activator.

29. The method of claim 28 wherein said catalyst activator is selected from the group consisting of dimethyl aniline, diethyl aniline, N,N-dimethyl-p-toluidine, and mixtures thereof.

30. The method of claim 22 wherein said acrylic monomer is selected from the group consisting of methyl methacrylate, ethyl acrylate, n-butyl acrylate, acrylamide, methacrylamide, and mixtures thereof.

31. The method of claim 22 wherein said acid monomer is selected from the group consisting of acrylic acid, methacrylic acid, and mixtures thereof.

32. A method of adhesively joining a pair of mating surfaces comprising applying to at least one of said mating surfaces a free radical addition polymerization catalyst activator in a sufficient amount to activate a free radical addition polymerization catalyst by contact, applying to at least one of said mating surfaces an activatable, curable adhesive comprising a solution of a non-reactive thermoplastic polyurethane polymer resin and a non-reactive epoxide resin dissolved in a free radical addition polymerizable acrylic monomer and a free radical addition polymerizable acid monomer copolymerizable with said acrylic monomer, said solution containing a catalytically effective amount of a non-activated free radical addition polymerization catalyst having a half-life of at least about one-half hour at 85° C, joining said pair of mating surfaces in a contact relationship and maintaining said contact relationship until said adhesive cures to a set.

33. The method of claim 32 wherein said adhesive comprises from about 10 to 70 weight percent of said polyurethane resin, from about 5 to 67 weight percent of said acrylic monomer, from about 5.0 to 67 weight percent of said acid monomer, and about 0.1 to 5.0 weight percent of said polymerization catalyst.

34. The method of claim 32 wherein said adhesive comprises from about 20 to 50 weight percent of said polyurethane resin, from about 20 to 40 weight percent of said acrylic monomer, from about 5.0 to 35 weight percent of said acid monomer, and about 0.5 to 2.0 weight percent of said polymerization catalyst.

35. The method of claim 32 wherein said acrylic monomer is selected from the group consisting of alkyl acrylate and alkyl methacrylate esters, acrylamide, methacrylamide, N-alkyl substituted amides, acrylonitrile, methacrylonitrile and mixtures thereof.

36. The method of claim 32 wherein said acid monomer is selected from the group consisting of acrylic acid, methacrylic acid, the hydroxyethyl acrylate half esters of maleic, itaconic fumaric, oxalic, terephthalic, and mixtures thereof.

37. The method of claim 32 wherein said polymerization catalyst is benzoyl peroxide.

38. The method of claim 32 wherein said adhesive is activatable by contact with a free radical addition polymerization catalyst activator.

39. The method of claim 38 wherein said catalyst activator is selected from the group consisting of dimethyl aniline, diethyl aniline, N,N-dimethyl-p-toluidine, and mixtures thereof.

40. The method of claim 32 wherein said acrylic monomer is selected from the group consisting of methyl methacrylate, ethyl acrylate, n-butyl acrylate, acrylamide, methacrylamide, and mixtures thereof.

41. The method of claim 32 wherein said acid monomer is selected from the group consisting of acrylic acid, methacrylic acid, and mixtures thereof.

42. The method of claim 32 wherein said epoxide resin is not reactive with any component of the adhesive.

43. The method of claim 22 wherein said activator is applied in a volatile carrier solvent, and said solent is evaporated prior to contacting said activator with said adhesive.

44. The method of claim 22 wherein said activator further comprises a free radical addition polymerization accelerator.

45. The method of claim 44 wherein said accelerator comprises a heavy metal salt.

46. The method of claim 45 wherein said heavy metal salt is a salt of a heavy metal selected from the group consisting of copper, iron, cobalt, manganese, lead and mixtures thereof.

47. The method of claim 45 wherein said heavy metal salt is a naphthenate of a heavy metal.

48. The method of claim 45 wherein said heavy metal salt is a salt of a heavy metal at an oxidation state lower than its highest oxidation state.

49. The method of claim 22 wherein said mating surfaces are the same or different members of the group consisting of steel, aluminum, wood, glass, polyvinyl chloride, nylon, polystyrene, polyesters, glass-reinforced polyesters, ABS, natural rubber, SBR rubber, neoprene, rubber, polyolefins, polytetrafluoroethylene, and galvanized steel.

50. The method of claim 22 wherein said activator is applied to one of said pair of mating surfaces and said adhesive is applied to the second of said mating surfaces.

51. The method of claim 22 wherein said activator is applied in an amount sufficient to form a layer of from about 0.01 to 0.5 mils in thickness.

52. The method of claim 22 wherein said activator is applied in an amount sufficient to form a layer of from about 0.05 to 0.1 mils in thickness.

53. The method of claim 22 wherein said adhesive is applied in an amount sufficient to form a layer of from about 0.3 to 40 mils in thickness.

54. The method of claim 22 wherein said adhesive is applied in an amount sufficient to form a layer of from about 1 to 5 mils in thickness.

55. The method of claim 22 wherein said adhesive cures to a set in a period of from less than one second to 600 seconds.

56. The method of claim 22 wherein said adhesive cures to a set in a period of from about 10 to 300 seconds.

57. In the method of forming a tubular can body by deforming a metal sheet into a tubular form and joining mating surfaces of the opposing edges of said metal sheet to form a side seam, the improvement comprising applying to at least one of said mating surfaces a free radical addition polymerization catalyst activator in a sufficient amount to activate a free radical addition polymerization catalyst by contact, applying to at least one of said mating surfaces an activatable, curable adhesive comprising a solution of a non-reactive thermoplastic polyurethane polymer resin dissolved in a free radical addition polymerizable acrylic monomer and a free radical addition polymerizable acid monomer co-polymerizable with said acrylic monomer, said solution containing a catalytically effective amount of a non-activated free radical addition polymerization catalyst having a half-life of at least about one-half hour at 85° C., joining said pair of mating surfaces in a contact relationship, and maintaining said contact relationship until said adhesive cures to a set.

58. The adhesive of claim 7 wherein said activator further comprises a free radical addition polymerization accelerator.

59. The adhesive of claim 7 wherein said accelerator comprises a heavy metal salt.

60. The adhesive of claim 8 wherein said accelerator comprises a heavy metal salt.

61. The adhesive of claim 60 wherein said heavy metal salt is a salt of a heavy metal selected from the group consisting of copper, iron, cobalt, manganese, lead and mixtures thereof.

62. The adhesive of claim 60 wherein said heavy metal salt is a naphthenate of a heavy metal.

63. The adhesive of claim 60 wherein said heavy metal salt is a salt of a heavy metal at an oxidation state lower than its highest oxidation state.

* * * * *